United States Patent Office 2,976,139
Patented Mar. 21, 1961

2,976,139

METHOD FOR PROMOTING THE FLOWERING OF PINEAPPLE PLANTS

Robert W. Leeper, Honolulu, Hawaii, and Victor C. Fusco, Ridgewood, N.J., assignors to Olin Mathieson Chemical Corporation, a corporation of Virginia No Drawing. Filed Oct. 9, 1957, Ser. No. 689,045

5 Claims. (Cl. 71—2.7)

This invention relates to a new composition of matter, the process of its production and the process of promoting flowering in vegetative pineapple plants by applying such composition to the plants. More specifically, this invention relates to certain 2-beta-hydroxyethylsemicarbazide hydrochlorides.

It has now been found that 2-beta-hydroxyethylsemicarbazide, as well as the isomeric 1-beta-hydroxyethylsemicarbazide, can be prepared by the reaction of beta-hydroxyethylhydrazine and urea according to the following equations:

(a) $HO-CH_2CH_2NHNH_2 + H_2N.CO.NH_2 \longrightarrow$
Beta-hydroxyethylhydrazine+urea

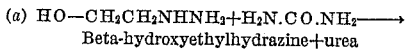
1-betahydroxyethylsemicarbazide+ ammonia (b) $HOCH_2CH_2NHNH_2 + H_2N.CONH_2 \longrightarrow$
Beta-hydroxyethylhydrazine+urea

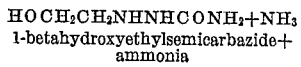
2-beta-hydroxyethylsemicarbazide+ ammonia

The 2-beta-hydroxyethylsemicarbazide hydrochloride is then formed and is readily separated from the 1-isomer by the lesser solubility of the former in diluted alcohol.

Example I

A mixture of 228 grams (3 moles) of beta-hydroxyethylhydrazine, 200 grams (3.33 moles) of urea and 100 milliliters of water was heated and stirred under reflux. At a temperature of 110° C., ammonia was evolved. The temperature was maintained at from 110° C. to 120° C. and the effluent gas was collected in water. After 2.75 hours of heating, titration of the collected solution of the effluent gas in water indicated that the reaction was about 75% complete. The reaction mixture was cooled to form a viscous, homogeneous liquid at room temperature and two-thirds of it, amounting to 328 grams, was diluted with 500 milliliters of absolute alcohol and saturated with hydrogen chloride gas. The crystalline hydrochlorides which separated were removed by decantation and extracted by trituration with 400 milliliters of a boiling 5:1 ethanol-water mixture. The undissolved residue was recrystallized from a mixture of 480 milliliters of alcohol and 180 milliliters of water. Long white needles separated and, after drying, melted at 163°–170° C. with decomposition. The analyses of these needles of 2-beta-hydroxyethylsemicarbazide hydrochloride were as follows:

| $C_3H_{10}ON_2Cl$ | Wt. Percent Acid as HCl | Wt. Percent C | Wt. Percent H | Wt. Percent N |
|---|---|---|---|---|
| Calculated | 23.5 | 23.16 | 6.46 | 27.01 |
| Found | 23.35 | 23.42 | 6.56 | 26.88 |

The 1-beta-hydroxyethylsemicarbazide hydrochloride isomer was crystallized from the dilute alcohol extract and was then recrystallized from a boiling 5:1 ethanol-water mixture. It was obtained as a solid melting at 130° C.–135° C. The analyses of this product were as follows:

| $C_3H_{10}ON_2Cl$ | Wt. Percent Acid as HCl | Wt. Percent C | Wt. Percent H | Wt. Percent N |
|---|---|---|---|---|
| Calculated | 23.5 | 23.16 | 6.46 | 27.01 |
| Found | 23.65 | 23.34 | 6.73 | 27.06 |

Control of flowering in pineapple is particularly important compared to other crops, because of the hand labor and machinery required for harvesting. If a complete harvest can be made in a second trip at a later date, labor costs, time and equipment costs are reduced. For this reason, it is important to control the flowering and fruiting by having available chemicals for treatment which will prevent flowering until the vegetative plants are of adequate size and then apply a compound which will accelerate the flowering and resulting fruiting of the plants. It is a further advantage of such treatment that the second crop borne on the mother plant will also appear more uniformly permitting a complete harvest. Subsequent fertilization and other field management operations are more efficient.

It has also been found that, when vegetative pineapple plants are treated with 2-beta-hydroxyethylsemicarbazide hydrochloride, their flowering is appreciably promoted. The compound can be applied to the plants in any of several ways known to the art. It may be applied directly by dusting, but, preferably, is first diluted with clays or other powders, e.g., pyrophyllite, diatomaceous earth, attapulgite. A wettable powder composition can be prepared by including wetting and suspending agents, for example anionics including alkylbenzene sulfonates (sodium dodecylbenzene sulfonate) or non-ionics including polyoxyalkylated tall oil or polyoxyethylated alkylphenol. Santomerse D is a proprietary alkylbenzene sulfonate and Atlas G1225 is a polyoxyethylated tall oil. The wettable powder is suitably diluted with water before application to the plants. Such aqueous compositions are usually applied to the plants by spraying.

The 2-beta-hydroxyethylsemicarbazide is thus applied to the plants at an average rate of from about 5 to 500 milligrams per plant, preferably about 50 to 150 milligrams per plant.

Example II

A number of pineapple plants were sprayed on October tenth with an aqueous solution of 2-beta-hydroxyethylsemicarbazide hydrochloride which applied 120 milligrams of the compound per plant. On the following January tenth, 40 percent of the plants so treated were in flower, although none of the untreated controls had flowered.

What is claimed is:

1. In the promotion of the flowering of vegetative pineapple plants, the step of applying 2-beta-hydroxyethylsemicarbazide hydrochloride to the plants in an amount effective to promote flowering of the plants.

2. The method of claim 1 in which the amount of 2-beta-hydroxyethylsemicarbazide hydrochloride applied is from 5 to 500 mg. per plant.

3. The method of claim 1 in which the amount of 2-beta-hydroxyethylsemicarbazide hydrochloride applied is from 50 to 150 mg. per plant.

4. The method of claim 1 in which the 2-beta-hydroxyethylsemicarbazide hydrochloride is applied to the plants in the form of a wettable powder.

5. The method of claim 1 in which the 2-beta-hydroxyethylsemicarbazide hydrochloride is applied to the plants in the form of a dust.

References Cited in the file of this patent

UNITED STATES PATENTS

| | | |
|---|---|---|
| 2,416,234 | Stillman et al. | Feb. 18, 1947 |
| 2,695,300 | Gever | Nov. 23, 1954 |

OTHER REFERENCES

Gowing et al. in "Science," Dec. 30, 1955, page 1267.

Rossel et al.: Berichte der Deutschen Chemischen Gesellschaft, vol. 27, page 56.

Das Gupta: J. Ind. Chem. Soc., vol. 10, 1933, pages 112–113.